United States Patent
Sugimura

(10) Patent No.: US 7,551,535 B2
(45) Date of Patent: Jun. 23, 2009

(54) REPRODUCING APPARATUS UTILIZING RECORDING MEDIUM IDENTIFIER

(75) Inventor: Naozumi Sugimura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 484 days.

(21) Appl. No.: 10/702,548

(22) Filed: Nov. 7, 2003

(65) Prior Publication Data

US 2005/0002302 A1    Jan. 6, 2005

(30) Foreign Application Priority Data

Jul. 4, 2003    (JP) .............................. 2003-191592

(51) Int. Cl.
    *G11B 7/005*    (2006.01)
(52) U.S. Cl. .................. 369/53.21; 369/53.11; 386/95; 386/126
(58) Field of Classification Search .............. 369/53.21, 369/59.19, 44.32, 53.11, 53.2, 47.12; 386/95, 386/96, 126
    See application file for complete search history.

(56) References Cited

U.S. PATENT DOCUMENTS

| | | | | |
|---|---|---|---|---|
| 5,652,741 | A * | 7/1997 | Takagi .................... | 369/30.06 |
| 5,699,331 | A * | 12/1997 | Oshima .................. | 369/47.11 |
| 5,805,551 | A * | 9/1998 | Oshima et al. ............... | 705/57 |
| 5,862,299 | A * | 1/1999 | Lee et al. ..................... | 386/94 |
| 6,381,588 | B2 * | 4/2002 | Oshima et al. ............... | 705/59 |
| 6,385,152 | B1 * | 5/2002 | Fujinami et al. ........... | 369/53.2 |
| 6,385,387 | B1 * | 5/2002 | Tanaka et al. ................ | 386/94 |
| 6,522,607 | B1 * | 2/2003 | Ishibashi et al. ........... | 369/47.1 |
| 6,580,647 | B1 * | 6/2003 | Yokota et al. .......... | 365/185.33 |
| 6,915,398 | B2 * | 7/2005 | Matsubara et al. .......... | 711/163 |
| 6,937,553 | B1 * | 8/2005 | Mitui et al. ................... | 369/84 |
| 2001/0038743 | A1 * | 11/2001 | Murata ....................... | 386/82 |

FOREIGN PATENT DOCUMENTS

| | | |
|---|---|---|
| JP | 11-007722 | 1/1999 |
| JP | 11-143719 | 5/1999 |
| JP | 2001-216764 | 8/2001 |
| JP | 2002-118807 | 4/2002 |
| JP | 2002-344887 | 11/2002 |

OTHER PUBLICATIONS

Electronic Translation of JP 11-007722.*
Japanese Office Action, in connection with JP Patent Application No. 2003-191592, dated Jun. 12, 2007.
"SAA are Wo Katte Miyoui Gorakuhen" On Line Shopping & Auction Wo Yatte Miyoui Locus Mook, first edition, issued from Locus Inc. on Jun. 25, 2000, pp. 30-33.

(Continued)

*Primary Examiner*—Wayne R Young
*Assistant Examiner*—Thomas D Alunkal
(74) *Attorney, Agent, or Firm*—Antonelli, Terry, Stout & Kraus, LLP.

(57) ABSTRACT

A reproducing apparatus provided with identifying information acquisition means to read recording medium identify information recorded on a recording medium and a storage unit to store the recording medium identify information acquired by the identifying information acquisition means so that the recording media which have been played are registered as library information. When a recording medium is to be played, this library information is used to determine whether to allow bonus images to be reproduced.

8 Claims, 5 Drawing Sheets

OTHER PUBLICATIONS

"Shinseiki Evangelion Ayanami Ikusei Keikaku with Asuka Hokan Keikaku" Dengeki PlayStation, vol. 9, No. 16, issued from Media Works on Jun. 27, 2003, pp. 150-153.

Notification of First Office Action from the Patent Office of the People's Republic of China, dated Oct. 13, 2006. (Chinese Patent Application Serial No. 2003101157717).

* cited by examiner

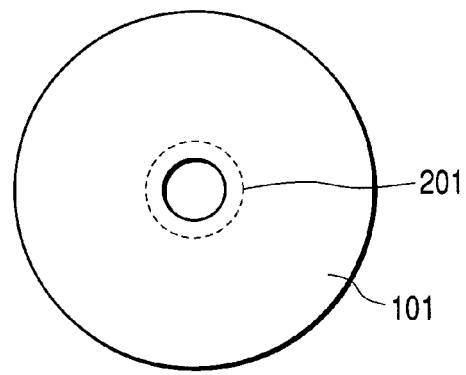
FIG. 2
FIG. 3
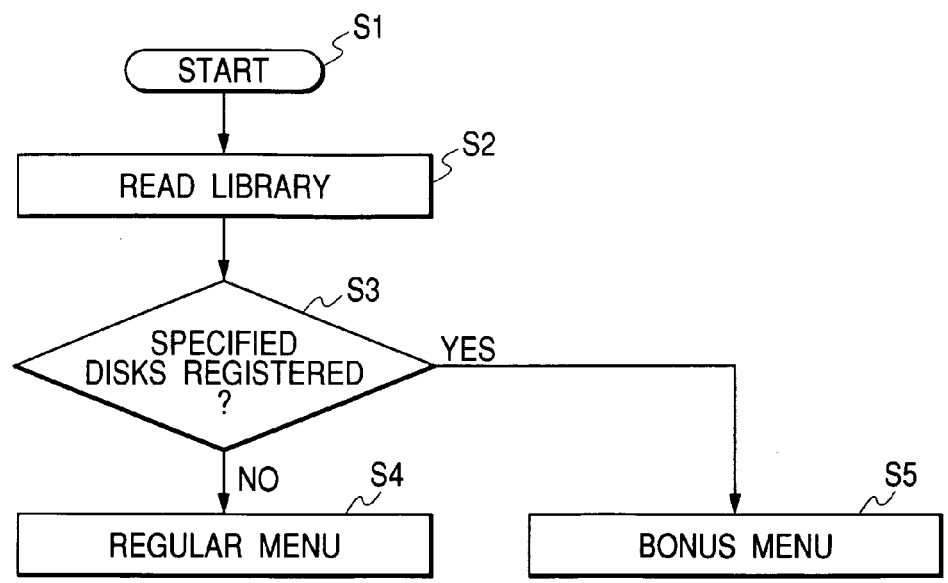
FIG. 4

REPRODUCING APPARATUS UTILIZING RECORDING MEDIUM IDENTIFIER

BACKGROUND OF THE INVENTION

The present invention relates to techniques for reproducing information recorded on a recording medium and, in particular, to a technique for reproducing image information, sound information and the like recorded on a recording medium.

Optical disks, represented by the so-called DVD (Digital Versatile Disk), have become widely popular. High quality images and sound can be recorded on these optical disks. Thus, optical disks are widely available with a variety of contents such as movies and TV programs recorded thereon.

By the way, the content of a TV program series or a movie series is sometimes released as successive separate DVDs with the same title.

In addition, such successive DVDs with the same title are often released as the so-called DVD box containing a plurality of DVDs. A DVD box sometimes comes with a special DVD where bonus images are recorded as a supplement in addition to DVDs where main contents are recorded respectively.

SUMMARY OF THE INVENTION

If a series of DVDs is released both as separate ones and as a DVD box, users who purchased the DVDs one by one cannot obtain the special DVD while users who purchased the DVD box can obtain the special DVD.

Therefore, if a user, after purchased the DVD series one by one, earnestly wants to obtain the special DVD, the user must purchase the DVD box, too.

It is an object of the present invention to solve this problem. In addition, it is an object of the present invention to provide an easy-to-use reproducing technique and reproducing system.

To solve the problem mentioned above, the present invention provides a reproducing apparatus which reproduces information recorded on a recording medium. This apparatus includes: identifying information acquisition means to read recording medium identify information recorded on a recording medium; a storage unit to store the recording medium identify information acquired by the identifying information acquisition means; and reproducing means to reproduce image information from the recording medium, wherein when a recording medium is to be played, recording medium identify information is acquired from the recording medium and stored in the storage unit.

In addition, the present invention provides a recording medium having image information and a program recorded thereon, wherein the program is executed when the recording medium is to be played in a reproducing apparatus and the program is configured so as to read recording medium identify information stored in a storage unit in the reproducing apparatus and cause a processing branch depending on the recording medium identify information.

BRIEF DESCRIPTION OF THE DRAWINGS

FIG. 2 is an outline diagram of an optical disk;
FIG. 3 shows the content of library information;
FIG. 4 is a flowchart showing how the program operates.

DESCRIPTION OF THE PREFERRED EMBODIMENTS

A first embodiment of the present invention will be described below.

It is assumed in the description of this embodiment that the recording medium is an optical disk while the present invention can be applied to a technique for reproducing information recorded on not only optical disks but also magnetic disks, magnetic tapes, semiconductor memories, hard disks and other recording media.

It is also assumed in the description of this embodiment that movie information has been recorded on the optical disk while the present invention can be applied to not only movie information but also music information and software games and other programs.

In addition, this embodiment is described on the assumption that the movie information is one of a 5-part series while the present invention can also be applied to a technique for reproducing non-series information recorded on a plurality of recording media. The invention can also be applied to a technique for reproducing information downloaded by the Internet.

Figure 1:
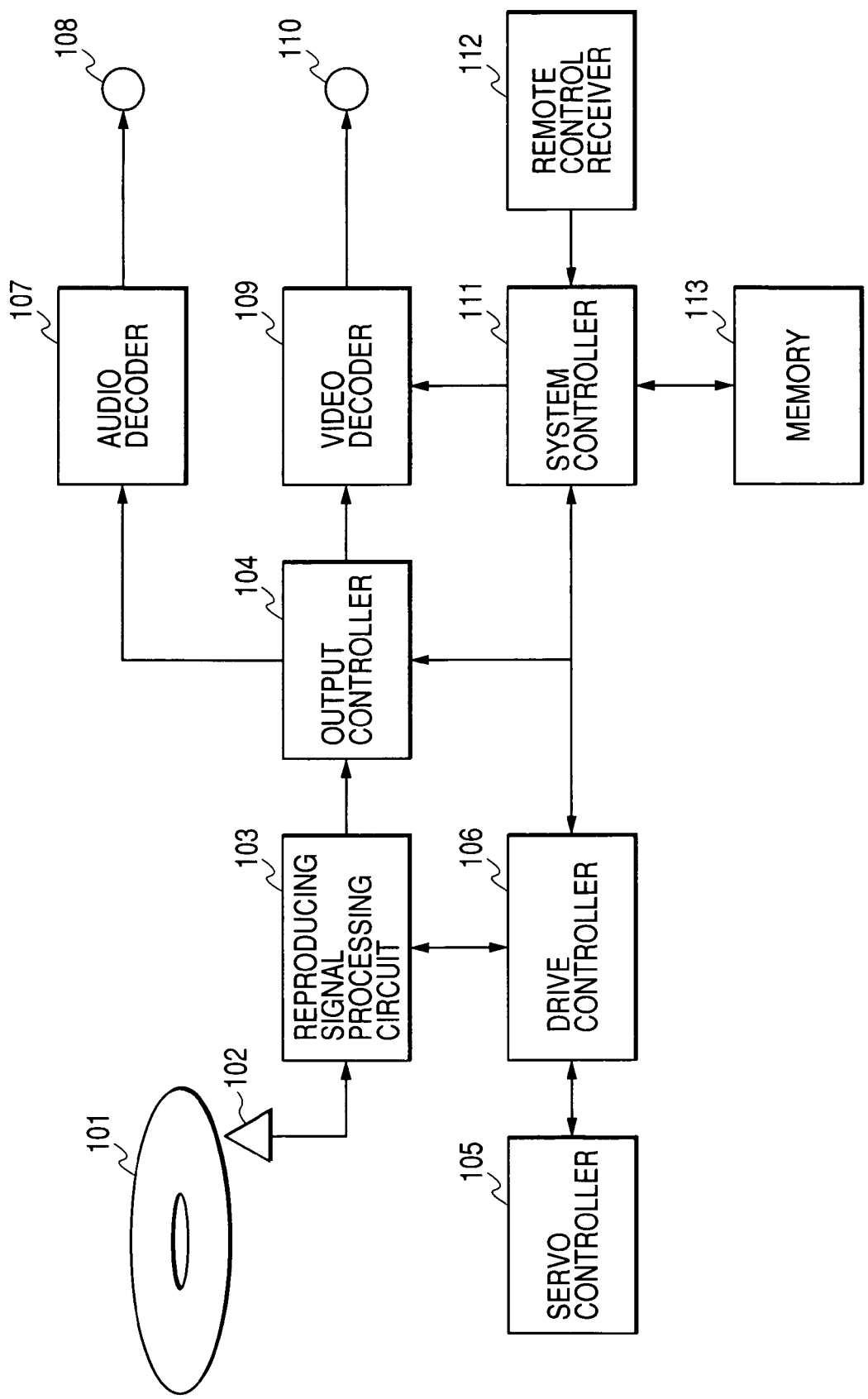
FIG. 1 is a block diagram of a reproducing apparatus.

FIG. 1 is a block diagram of a reproducing apparatus according to the first embodiment.

In FIG. 1, an optical disk 101 has movie information, a program to reproduce the movie information, disk identifier information and so on recorded thereon. The disk identifier information will be described later. An optical pickup 102 reads a signal from the optical disk. A reproducing signal processing circuit 103 reproduces data by performing prescribed demodulate processing on the signal read from the optical disk. An output controller 104 outputs the reproduced data at prescribed timings. A servo controller 105 controls the rotating speed of the optical disk and the position of the optical pickup. A drive controller 106 controls the servo controller 105 and the reproducing signal processing circuit 103. An audio controller 107 decodes the audio signal. The decoded audio signal is output from an audio output terminal 108. A video decoder 109 decodes the video signal. The decoded video signal is output from a video output terminal 110. A system controller 111 generally controls the reproducing apparatus. A remote control receiver 112 receives a signal from a remote controller. A memory 113 stores at least disk identifier information.

Firstly, the user sets an optical disk 101 that is wanted to play into the reproducing apparatus and pushes a play button on the remote controller (not shown). A signal from the remote controller is received by the remote control receiver 112 and put into the system controller 111. According to the play start command from the remote controller, the system controller 111 controls the individual blocks so as to start playing the optical disk 101.

When play is started, the reproducing apparatus automatically performs library registration. In this library registration, information such as disk identifier information (hereinafter denoted as disk ID) recorded on the optical disk 101 is read out and stored. Here, it is described how the disk ID is used to identify the disk on the assumption that the disk ID uses a BCA (Burst Cutting Area) in this example.

The following describes in detail how the library registration is made.

Firstly, assume that library registration is to be made from a medium on which the first of a movie series is recorded.

FIG. 2 is an outline diagram of an optical disk. Reference numeral 201 is a data recording area called a BCA.

Usually, a read-only optical disk has bumps called pits formed thereon. Data recording is done by forming or not forming pits. Optical disks where the same information is recorded are mass-produced by pressing with the master matrix having bumps and lands.

Meanwhile, the BCA 201 is positioned inside the regular data area on the optical disk 101. In the BCA 201, an ID unique to the disk is recorded by engraving it with a special laser beam. Information recorded in the BCA 201 can be read out by the conventional optical pickup 102 according to changes in reflectivity.

In the BCA 201, the production maker, title, series name, serial number and other information about the content recorded on the optical disk 101 are recorded.

When the disk is to be played, the reproducing apparatus reads out the disk ID recorded in the BCA 201. More specifically, when the reproduction processing is started, the system controller 111 generates a command to the drive controller 106 to read out the BCA 201. According to this BCA readout command, the drive controller 106 controls the servo controller 105 to rotate the optical disk 101 at a prescribed speed and locate the optical pickup 102 near the BCA near the center of the optical disk 101. The disk ID read out by the optical pickup 102 goes through the reproducing signal processing circuit 103 and is entered into the drive controller 106 and delivered to the system controller 111.

From the read disk ID, the system controller 111 retrieves the maker ID, title ID, series ID and others of the optical disk 101 to be played. These retrieved sets of information are stored in the memory 113 as library information together with the date/time of play.

If library information having the same disk ID is already stored in the memory 113, it is not necessary to store the information again. This configuration can reduce the capacity of the memory 113.

While in this example, information written in the BCA 201 is used for disk identification, any kind of information can also be used as far as the information allows the disk to be identified. For example, information written in a prescribed sector on the disk may be used. Part of the information written in a file on the disk can also be used for disk identification. Further, the disk ID can also be written on the disk in the form of a bar code. In this case, a dedicated reader is provided to read in the information and put it into the system controller 111. Of course, it is also possible to embed a semiconductor chip in the disk. Information can be read out from the chip and used as the disk ID. The disk may also be configured so as to allow the disk ID to be entered into the chip from external.

FIG. 3 shows an example of library information stored in the memory 113.

In FIG. 3, reference numeral 301 denotes the maker ID; 302, a title ID; 303, a series ID; 304, date/time of play; and 305, end position.

This library information stored concerns each disk which has been played. Using this, it is possible to obtain such information as what disks have been played by the user, when a disk was played last and where the user ceased playing a disk.

If the first movie information of a series is recorded on the disk as assumed above, "1" is stored as the series ID when the disk is played.

Similarly, if the second movie information is recorded on the disk, "2" is stored as the series ID.

The following describes how disk IDs are used after library registration is completed for them.

Figure 5A:
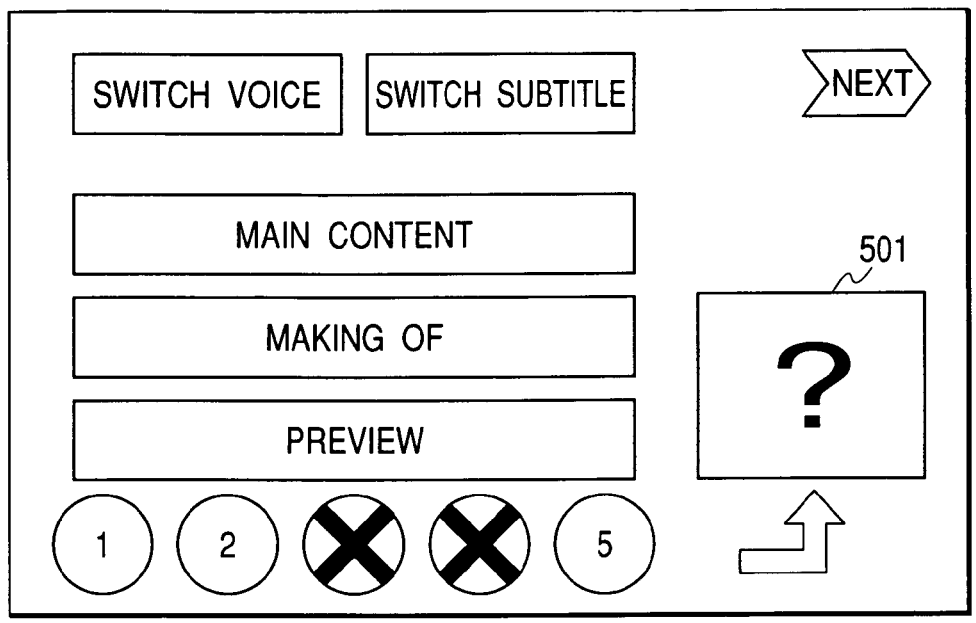
FIGS. 5(*a*) and 5(*b*) each shows a menu display screen.
Figure 5B:
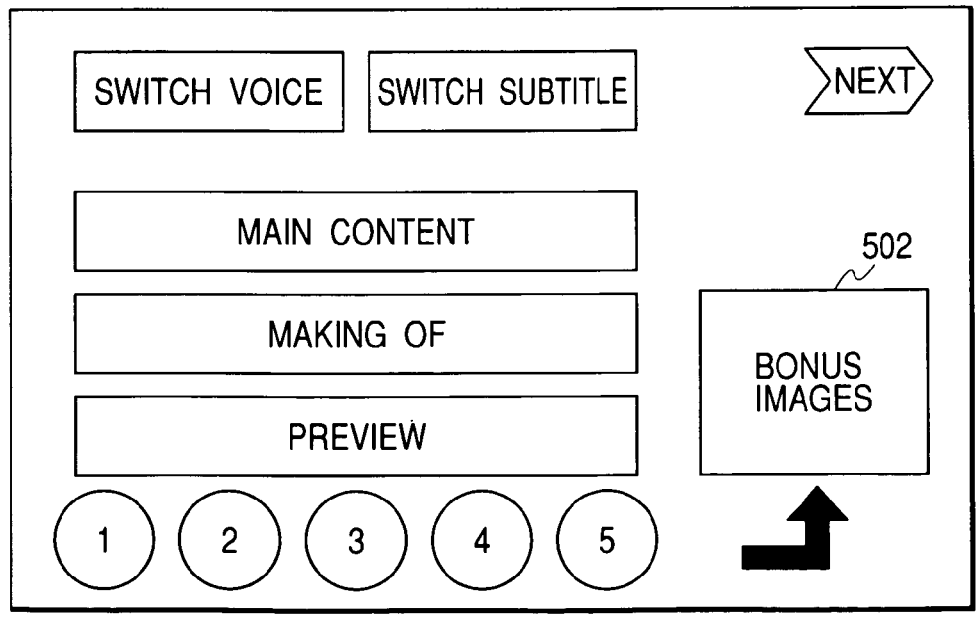

Assume that a disk where the fifth movie information of a series is recorded is to be played while library registration is already made from the respective disks where the first and second of the series are recorded. Also assume that on the fifth disk, bonus information, a program to judge whether library registration is made from the first through fifth movies and information necessary to display such screens as shown in FIGS. 5(a) and 5(b) described later (hereinafter denoted as "menu display program") are recorded.

Firstly, data is read out from the optical disk 101 to make library registration. That is, series ID "5" is added.

Then, file management information is read out to identify the files recorded on the optical disk 101. In more detail, anchor information written in a prescribed sector is read out to acquire the position of the file management information. The file management information is read out from the position. The file management information may be recorded according to such a file system as the UDF (Universal Disc Format). This file system makes it possible to treat sets of information recorded on the disk as individual files. Files can be read out by specifying their file identifiers (filenames). The embodiment may also be configured so as to read out the file management information before library registration.

When the fifth optical disk 101 is to be played, a file is read out and executed to run a menu display program. This file contains the menu display program and is given a file identifier which indicates the file should be executed first.

The following concretely describes how the menu display program operates.

FIG. 4 is a flowchart representing the operations of the menu display program.

Firstly if the menu display program is started (S1), library information is read out in the library readout step (S2). Concretely, library information stored in the memory 113 is sequentially read out by the system controller 111. As shown in FIG. 3, the library information includes such information as a maker ID, a title ID, series ID, date/time of play and a play end position. Here, "1", "2" and "5" are stored as series IDs.

The system controller 111 judges whether the retrieved library information includes the specified disks (S3), that is, whether series IDs "1" through "5" are present.

If the specified disks are all included, the system controller 111 judges that the user has all disks, that is, the user is entitle to reproduce bonus images. In this case, a bonus menu is displayed (S5).

According to the assumption mentioned earlier, however, the specified disks are not all included in the retrieved library information. Therefore, the system controller 111 judges that the user does not have all of the specified disks, that is, the user is not entitled to reproduce bonus images. In this case, the regular menu is displayed (S4).

To display the menu screen in the first embodiment shown in FIG. 1, the system controller 111 writes information into an image memory in the video decoder 109. Instead of using a memory in the video decoder, however, the menu screen display function many also be implemented by adding a separate memory for the menu display screen. In this case, the embodiment may be configured in such a manner that the output video signal is switched between the memory and the video decoder or the output of the memory is superimposed on the signal of the video decoder.

FIGS. 5(a) and 5(b) shows examples of the regular and bonus menus.

FIG. 5(a) is an example of the regular menu displayed on the screen while FIG. 5(b) is an example of the bonus menu on the screen.

When the optical disk 101 is to be played, the regular menu as shown in FIG. 5(a) is displayed to the user since the first, second and fifth disks of the movie series are included in the library information. In this case, to notify the user that he does not have the third and fourth disks, the corresponding title areas are each given an X mark. A menu button 501 to select the bonus images is either not displayed or displayed but inoperable since the bonus images may be selected only if the user has all of the first through fifth disks.

Meanwhile, if library registration has been made also from the third and fourth disks, that is, the disk IDs of the first through fifth disks are stored in the memory 113, it is judged that information about all disks are stored (S3). In this case, the bonus menu is displayed (S5). Concretely, the user can select the image display button 502 to display the bonus images. According to the displayed menu, the user can select and play his desired program.

The library information can also be modified so as to allow each disk to be judged as a disk for rental or sell by the ID, making it possible to provide the bonus images only if the user has actually purchased all of the series.

It is also possible to extend the library information check so as to examine when each disk was played last, making it possible to provide the bonus information only if all disks were played within the last, for example, one year, that is, limit the availability period of the bonus information.

It is also possible to extend the check so as to examine whether a specific disk has not been played, making it possible to indicate that the disk has not been played if so.

It is also possible to modify the menu display program so as to guess the user's favorites from the library information and display a menu that is most likely to be desired by the user.

In addition, series IDs are not limited to such identifiers as "1", "2" and "3".

In addition, while the reproducing apparatus has been described on the assumption that the memory 113 having the library information stored therein is incorporated in the reproducing apparatus, it is possible to use a detachable memory such as a memory card. Using a memory card allows the library information to be accumulated and used successively even if a new reproducing apparatus is purchased or a disk is played by another reproducing apparatus in another place. Of course, the memory card may be a non-contact memory card using radio communication or the like. Combined with such a payment function as provided by a credit card or electronic money, this memory card allows a variety of applications such as pay-per-view programs.

In addition, it is also possible to allow the user to get bonus contents via a network if all disks of a series are played. In this case, the bonus information must not be recorded on the disk.

In the first embodiment, it is possible to determine which contents may be played according to the recording media which have been played by the user. Therefore, it is possible to provide special information to all users as far as they possess a specific set of information. For example, it is possible to provide special information to all users who purchased all recording media constituting a series regardless of whether they were purchased one by one or as a set like a DVD box.

Then, a second embodiment of the present invention will be described below.

In the first embodiment, the memory 113 incorporated in the reproducing apparatus is used to store the library information and select which menu is to be displayed.

With the spread of the Internet and other networks, services are being provided to a variety of apparatus via networks.

Figure 6:
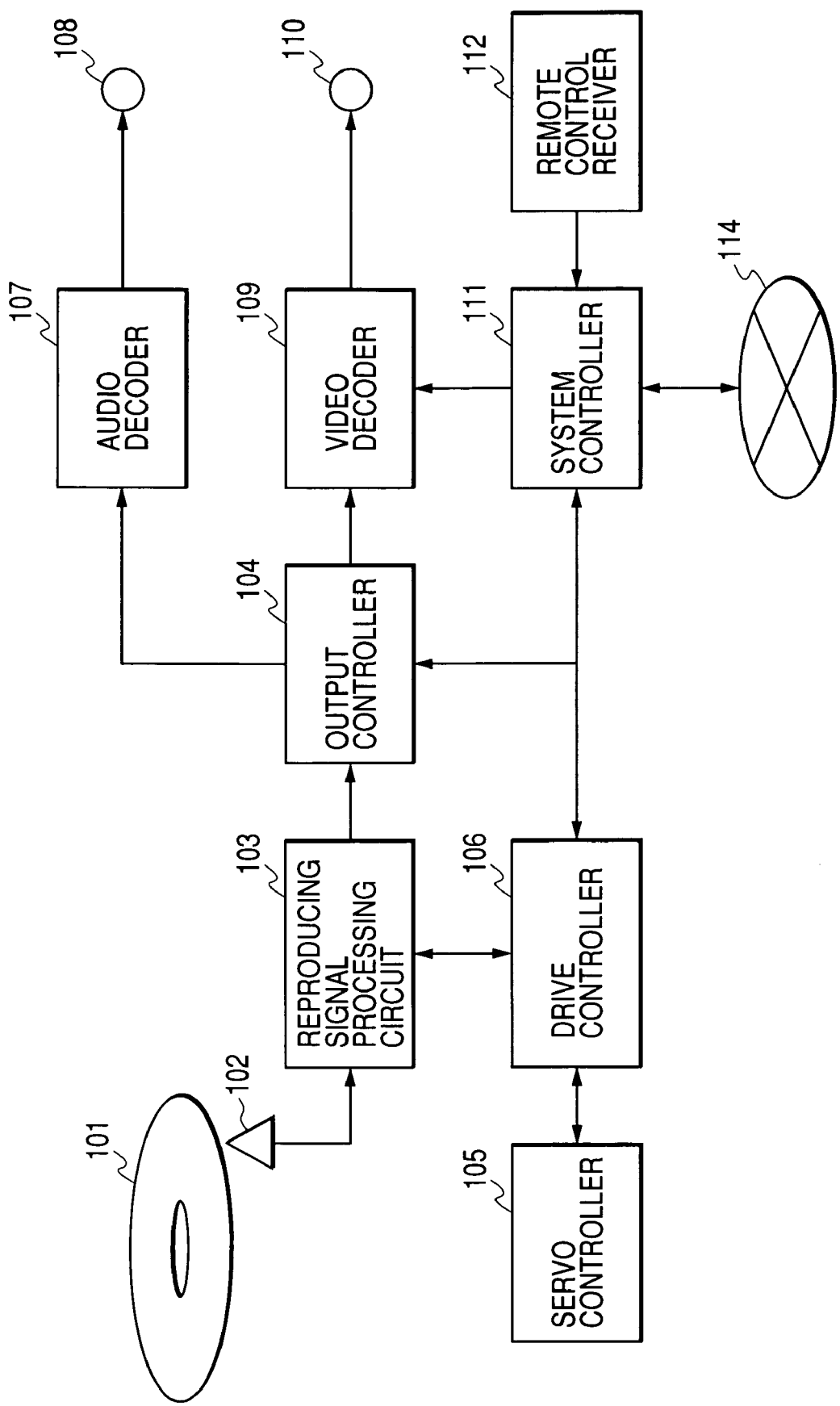
FIG. 6 is a block diagram of a reproducing apparatus.

FIG. 6 shows the configuration of a reproducing apparatus according to the second embodiment. This reproducing apparatus is connected with a network.

In FIG. 6, blocks given respectively 101 through 112 are identical in function to the corresponding blocks shown in FIG. 1. Reference numeral 114 denotes a network.

Figure 7:
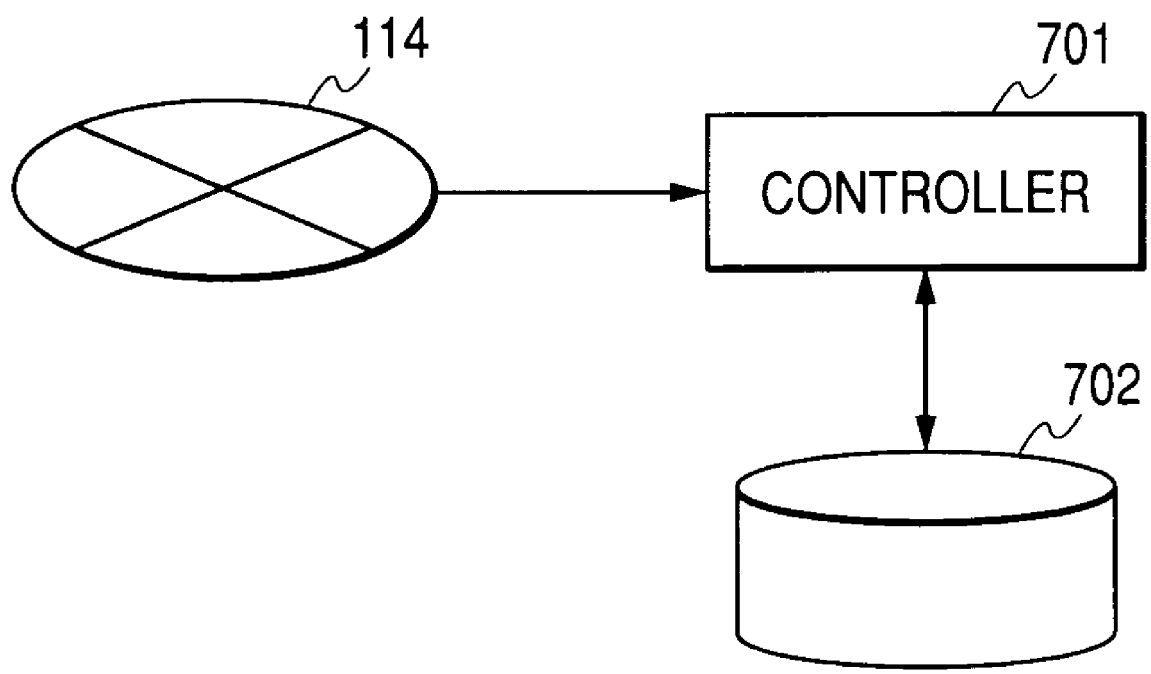
FIG. 7 shows a server connected via a network.

FIG. 7 shows the server side connected with the network.

In FIG. 7, reference numeral 114 is the network, 701 is a controller and 702 is a storage device.

The reproducing apparatus shown in FIG. 6 is connected with the controller 701 or one of the external devices via the network 114.

When an optical disk 101 is played in the reproducing apparatus, the disk ID is read out from the optical disk 101 in the same manner as in the reproducing apparatus of the first embodiment. Through a prescribed authentication procedure, the system controller 111 establishes a link with the controller 701 connected to the network 114. In this authentication, a device ID unique to the reproducing apparatus is used so as to allow the reproducing apparatus to be identified. After the authentication procedure is complete, the system controller 111 transmits the aforementioned disk ID to the controller 701 via the network.

The controller 701 stores the device ID and disk ID, which are sent from the reproducing apparatus, on the storage device 702.

Thus, library information can be stored on the storage device 702 in the same manner as library information is stored in the memory 113 in the first embodiment.

The following describes how a menu display program selects and displays a menu.

The system controller 111 reads out the menu program from the optical disk 101 and performs processing according to the program. The menu program operates according to the flowchart shown in FIG. 4 for the first embodiment.

Firstly if the menu program is started to operate (S1), library information is read out (S2). In this step, since the library information is stored in the server on the network, the system controller 111 in the reproducing apparatus connects to the server via the network to perform authentication with the controller 701. Once the authentication is complete between the system controller 111 and the controller 701, the system controller 111 in the reproducing apparatus requests the controller 701 to transmit the library information.

Upon receiving the library transmission request, the controller 701 reads out the library information associated with the reproducing apparatus from the storage device 702 and transmits it via the network 114. Although libraries which are associated respectively with a plurality of reproducing apparatus are stored, it is not necessary to transmit all libraries. Since the server can use the device ID of the authenticated reproducing apparatus to identify which reproducing apparatus has requested the library information, the server need not retrieve/transmit more than the library information associated with the device ID.

The reproducing apparatus judges based on the library information transmitted from the server whether the specified disks are present in the library (S3) and displays the regular menu (S4) or the bonus menu (S5) according to the judgment.

The displayed menu screens and the subsequent operations are the same as in the reproducing apparatus of the first embodiment.

As described so far, saving the library and selecting a menu screen can be done by using the network.

Note that although the second embodiment has been described on the assumption that only the library information is received from the server via the network, the second embodiment allows a variety of modifications.

For example, the second embodiment may be configured in such a manner with an optical disk 101 having no menu display screen information recorded thereon that when the disk is played, the menu display screen information is generated on the server and transmitted to the reproducing apparatus via the network. If the specified disks are present in the library, the server generates and transmits the screen information including a bonus menu to the reproducing apparatus, which in turn displays the bonus screen. If the library in the server has not all of the specified disks, the server generates and transmits the screen information including no bonus menu to the reproducing apparatus, which in turn displays the regular menu transmitted from the server.

Using the displayed menu screen, the user selects a program as the one to be played.

Through the procedure mentioned above, the menu to be displayed is switched depending on the disks that have been played by the user, making it possible to display the bonus menu if the user is judged entitled.

Similar to the first embodiment, the second embodiment also allows a variety of modifications such as discrimination between disks for rental and for sell and limitation of the disks considered for judgment to those which were played within the last one year.

I claim:

1. A reproducing apparatus which reproduces information recorded on a recording medium, comprising:
   a pickup which reads information including recording medium identifier information, a first content, and a second content recorded on the recording medium, wherein both the first content and the second content are audio visual information;
   a reproducing signal processing circuit which reproduces the information read by the pickup;
   a memory which stores a plurality of recording medium identifier information sets which have ever been processed by the reproducing signal processing circuit; and
   a controller which controls the reproducing apparatus;
   wherein the recording medium identifier information includes an ID unique to the recording medium;
   wherein the controller permits reproduction of the second content when the recording medium identifier information stored in the memory satisfies a predetermined requirement;
   wherein the first content can be reproduced whether or not the recording medium identifier information satisfies the predetermined requirement, and
   wherein the predetermined requirement includes a number of the recording medium identifier information sets, stored in the memory, that are required to reproduce the second content.

2. A reproducing method for reproducing information which includes recording medium identifier information, a first content, and a second content recorded on a recording medium, comprising the steps of:
   reproducing recording medium identifier information that includes an ID unique to the recording medium;
   storing plurality of recording medium identifier information sets which have ever been processed;
   reproducing the second content when the recording medium identifier information stored in a memory satisfies a predetermined requirement; and
   reproducing the first content whether or not the recording medium identifier information satisfies the predetermined requirement;
   wherein both the first content and the second content are audio visual information, and
   wherein the predetermined requirement includes a number of the recording medium identifier information sets, stored in the memory, that are required to reproduce the second content.

3. A reproducing apparatus for reproducing information stored on a recording medium, the information comprising:
   recording medium identifier information for identifying the recording medium;
   a first content;
   a second content;
   wherein both the first content and the second content are audio visual information, and wherein the recording medium identifier information includes an ID unique to the recording medium; and
   a program which controls the reproducing apparatus to execute the steps of:
      reading out the recording medium identifier information stored in the reproducing apparatus; and
      reproducing the second content when the recording medium identifier information read out from a memory satisfies a predetermined requirement,
      wherein the predetermined requirement includes a number of the recording medium identifier information sets, read out from the memory, that are required to reproduce the second content.

4. The reproducing apparatus according to claim 1, wherein the memory is detachable.

5. The reproducing apparatus according to claim 1, wherein a program required for the decision processing is obtained from the recording medium.

6. The reproducing apparatus according to claim 1, wherein the controller can obtain information from an external device via a network and a program required for the decision processing is obtained from the external device via the network.

7. The reproducing method according to claim 2, wherein a program required for the decision processing is obtained from the recording medium.

8. The reproducing method according to claim 2, wherein a program required for the decision processing is obtained from an external device via a network.

* * * * *